United States Patent
Sharanhovich et al.

(10) Patent No.: US 9,990,303 B2
(45) Date of Patent: Jun. 5, 2018

(54) SHARING DATA STRUCTURES BETWEEN PROCESSES BY SEMI-INVASIVE HYBRID APPROACH

(71) Applicant: Oracle Corporation, Redwood Shores, CA (US)

(72) Inventors: Uladzislau Sharanhovich, San Jose, CA (US); Anand Srinivasan, Bangalore (IN); Dmitry Golovashkin, Belmont, CA (US); Vaishnavi Sashikanth, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days. days.

(21) Appl. No.: 15/682,259

(22) Filed: Aug. 21, 2017

(65) Prior Publication Data

US 2017/0344488 A1 Nov. 30, 2017

Related U.S. Application Data

(63) Continuation of application No. 14/823,328, filed on Aug. 11, 2015, now Pat. No. 9,740,626.

(51) Int. Cl.
*G06F 12/10* (2016.01)
*G06F 12/1018* (2016.01)
*G06F 9/54* (2006.01)
*G06F 17/30* (2006.01)
*G06F 12/1036* (2016.01)

(52) U.S. Cl.
CPC .............. *G06F 12/10* (2013.01); *G06F 9/544* (2013.01); *G06F 12/1018* (2013.01); *G06F 12/1036* (2013.01); *G06F 17/3015* (2013.01); *G06F 2212/657* (2013.01)

(58) Field of Classification Search
CPC ... G06F 12/10; G06F 12/1018; G06F 12/1036
USPC ........................................................ 711/203
See application file for complete search history.

(56) References Cited

U.S. PATENT DOCUMENTS

| | | | |
|---|---|---|---|
| 2006/0085433 A1* | 4/2006 | Bacon ................. | G06F 12/0253 |
| 2011/0202569 A1* | 8/2011 | Rankov ............. | G06F 17/30595 707/792 |
| 2011/0219204 A1* | 9/2011 | Caspole .............. | G06F 12/0253 711/173 |

(Continued)

*Primary Examiner* — Than Nguyen
(74) *Attorney, Agent, or Firm* — Hickman Palermo Becker Bingham LLP

(57) ABSTRACT

Techniques herein are for sharing data structures. In embodiments, a computer obtains a directed object graph (DOG) containing objects and pointers interconnecting the objects. Each object pointer (OP) resides in a source object and comprises a memory address (MA) of a target object (TO). An original address space (OAS) contains the MA of the TO. The objects are not contiguous within the OAS. The DOG resides in original memory segment(s). The computer obtains an additional memory segment (AMS) beginning at a base address. The computer records the base address within the AMS. For each object in the DOG, the computer copies the object into the AMS at a respective address. For each OP in the DOG having the object as the TO of the MA of the OP, the computer replaces the MA of the OP with the respective address. AMS contents are provided in another address space.

20 Claims, 8 Drawing Sheets

(56) References Cited

U.S. PATENT DOCUMENTS

2015/0227316 A1\* 8/2015 Warfield .............. G06F 3/0611
    711/103

\* cited by examiner ized data, such as a data frame or a
SHARING DATA STRUCTURES BETWEEN PROCESSES BY SEMI-INVASIVE HYBRID APPROACH

CROSS-REFERENCE TO RELATED APPLICATIONS; BENEFIT CLAIM

This application is a continuation of application Ser. No. 14/823,328 filed Aug. 11, 2015, entitled "Sharing Data Structures Between Processes by Semi-Invasive Hybrid Approach", the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to techniques for transferring a graph of objects across process boundaries. Specific techniques are included that preserve the integrity of object pointers within the graph that reference objects within or outside of the graph.

BACKGROUND

The lifecycle of electronic data may span multiple computer programs. For example, one program may produce data for another program to consume. Computer environments offer primitive mechanisms to accomplish data sharing between programs. These primitives include files, sockets, queues, pipes, shared memory, and messages. However, these primitives treat data as opaque. As such, they lack support for determining the extent of data to transmit and determining the structure of data received.

Existing frameworks more or less assist with exchanging structured data. Such frameworks include dynamic data exchange (DDE), common object request broker architecture (CORBA), extensible markup language (XML), JavaScript Object Notation (JSON), and Java object serialization. However, because these frameworks do not offer a robust integration of received data into existing data, an entire lifecycle of data is unsupported. For example, a receiver may need a mechanism to merge received structures with its own structures. Likewise the receiver may revise the received data and return that data back to an original sender, in which case the original sender faces the same problem of an unsupported merge.

This unmet need is aggravated if exchanged data has some pointers that point to elsewhere within the exchanged data and other pointers that point to outside of the exchanged data. Especially acute is a problem of an exchange that incorporates data drawn from different memory resources, such as a call stack, a heap, and a static region. Upon receipt, the exchanged data may also need integrating with call stack and a heap, for example.

These problems arise in a variety of programming languages, such as C, Java, and Python. Another example is the statistical programming language, R, which may process an immense dataset. R provides a rich statistical environment that includes and supports various canned computations for fields such as statistics, mathematics, and physics. However, R does not support sharing data objects amongst processes. R has a single threaded architecture that is built upon many global structures that are referenced throughout R local data structures, which makes such structures non-portable. This means that an R data structure, such as a data frame or a vector, cannot be simply copied into a memory of another R process.

Consequentially, R computation is almost impossible to parallelize for horizontal scaling as needed to timely process multi-gigabyte datasets. Besides R, other languages also either do not support multitasking or have non-portable data structures due to usage of global variables and embedded pointers. This challenging programming problem exists for many large systems that include legacy components that need to exchange vast amounts of data between them.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Virtual Memory System
2.1 Compaction Mechanisms
2.2 Compaction Structural Overhead
2.3 Attachment Overview
2.4 Graph Relocation
2.5 Pointer Adjustment
3.0 Example Attachment Method
4.0 Pointer Arithmetic with Offset from Base Address
5.0 Header Region
6.0 External and Internal Relocation Regions 7.0 Objects not in Graph
7.1 Global Objects
7.2 Singleton Objects
8.0 Shared Memory
8.1 Copy-On-Write
8.2 Unmapping
9.0 Memory Mapped File
10.0 Hardware Overview
11.0 Extensions and Alternatives 1.0. General Overview Techniques are described herein for sharing data structures between computer application processes using virtual memory. In an embodiment, a computer obtains a directed object graph that contains objects and pointers that interconnect the objects. Each object pointer resides in a source object. Each object comprises a memory address of a target object. An original address space contains the memory address of the target object. The objects are not contiguously stored in the original address space. The directed object graph resides in one or more original memory segments of the original address space. The computer obtains an additional memory segment that begins at a base address within the original address space. The computer records the base address within the additional memory segment. For each particular object in the directed object graph, the computer copies the particular object into the additional memory segment at a respective address. For each object pointer in the directed object graph having the particular object as the target object of the memory address of the object pointer, the computer replaces the memory address of the object pointer with the respective address. The contents of the additional memory segment are eventually provided in a different address space that is not the original address space.

In an embodiment, pointer adjustment uses relocation regions that inventory object pointers that occur in the object graph. In an embodiment, global objects need not be embedded in the object graph. In an embodiment, the objects are contiguously copied into the additional memory segment. In embodiments, shared memory or a file is memory mapped to facilitate providing the copied object graph to another process.

2.0 Example Virtual Memory System

Figure 1:
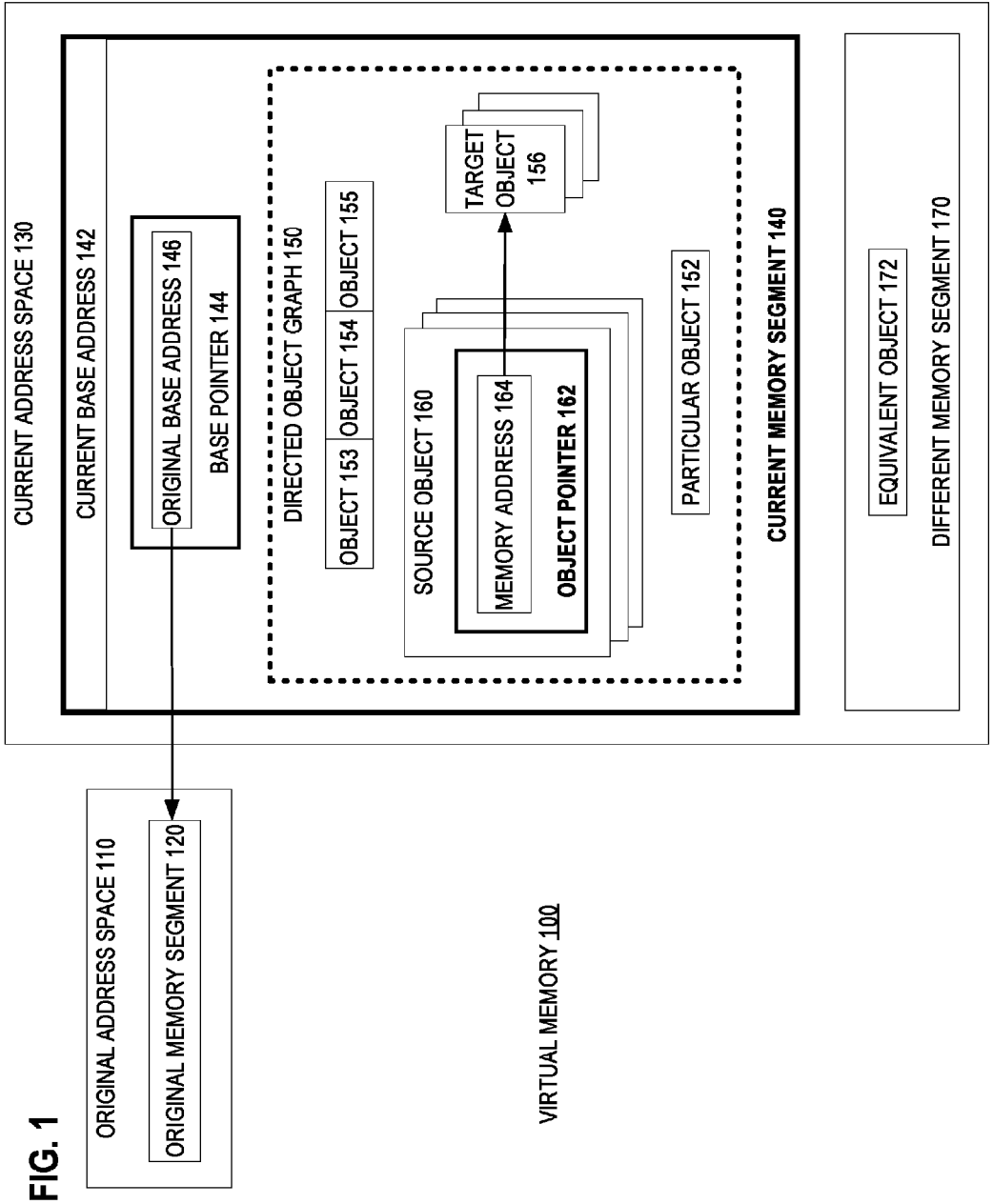
FIG. 1 is a logical block diagram illustrating an example virtual memory in which certain techniques described herein may be implemented, according to various embodiments.

FIG. 1 illustrates a block diagram of example virtual memory 100 that provides address spaces for addressable object storage, in which techniques described herein may be practiced. Virtual memory 100 is a memory managed by an operating system of a computer. The computer may be a personal computer, embedded computer such as a single board computer, system on a chip, smartphone, network appliance, rack server such as a blade, mainframe, virtual machine, or any other computer able to host an operating system. The operating system may be general purpose such as for a server or desktop, embedded or real time, time shared, virtual, multi-tenant, cloud based, or any other operating system that virtualizes memory, perhaps according to pages or segments.

Virtual memory 100 may comprise volatile memory such as dynamic random access memory, nonvolatile memory such as a solid state drive, durable storage such as a magnetic disk, or a tiered arrangement of these. Virtual memory 100 also comprises original address space 110 and current address space 130. Each of address spaces 110 and 130 has a range of contiguous virtual addresses. Address space 110 is owned by an original process managed by the operating system. Address space 130 is owned by a current process managed by the operating system. The original process produces directed object graph 150 which may then be transferred for consumption by the current process.

2.1 Compaction Mechanisms

Transfer of directed object graph 150 may have performance and security concerns that can be alleviated by compacting directed object graph 150 prior to transfer. For example, heap fragmentation may impact performance. Within original address space 110 are original data objects, which may include data primitives, data structures, and high level data objects. An additional memory management layer may exist in between original address space 110 and its constituent original data objects. For example, the original data objects may be arranged in a heap, on a stack, in a static allocation, some combination of these, or another configuration. The additional memory management layer may cause fragmentation, such that the original data objects are not contiguous within original address space 110 and may be separated from each other by unused memory portions. Likewise, the original data objects may be a mix of objects intended for transfer to the current process and private objects not intended for transfer, such that those intended for transfer are not contiguous. Such fragmentation may incur a performance penalty. Furthermore, security or integrity may be compromised if the original process shares the mix of objects, including those not intended for transfer.

The original process uses compaction to arrange objects for sharing in a way that may improve performance and security. Compaction involves copying transferable objects into original memory segment 120 from elsewhere in original address space 110. Original address space 110 comprises original memory segment 120. Current address space 130 comprises current memory segment 140. Each of memory segments 120 and 140 has a range of contiguous virtual addresses, which is a subrange of an enclosing address space, respectively either address space 110 or 130. Memory segments 120 and 140 may consist of virtual memory segments, virtual memory pages, or other units of virtual memory.

During compaction, the original process selects objects to share and contiguously copies them into original memory segment 120. Compaction may impose technical concerns on the original process. For example, a referring object may have a pointer to a target object. The pointer may record an address or handle that indicates where in original address space 110 does the target object reside. Merely copying the referring object, its pointer, and the target object from original memory segment 120 to current memory segment 140 may be inadequate. With such copying, the copied pointer still records the address of the target object before copying. The copied pointer should instead record the address of the target object after copying. Consequentially, the original process may need to adjust the copied pointer by reassigning its recorded address to the address of the target object after copying.

Compaction imposes other technical concerns. Object selection, object copying, or pointer adjustment may involve low level structural access or memory access that is unavailable in a same high level language for which the data objects are intended. For example, a high level language such as Java or R may offer data abstractions that are too far removed conceptually from memory details to enable custom compaction. If the original process is based on such a high level language, then the original process may need to incorporate a low level library such as a C library or utilize a special programming interface or framework included with the high level language. If the original process is multithreaded, then the original process may need to suspend some threads during compaction to prevent mutation or movement of objects.

Another concern is that original memory segment 120 must be big enough to store all of the transferable objects and some structural overhead. Accordingly, the original process must either precompute a size and pre-allocate original memory segment 120, or original memory segment 120 must grow dynamically, which can cost time and space for additional, perhaps repeated, copying of data by the operating system.

2.2 Compaction Structural Overhead

Mere compaction into original memory segment 120 is insufficient. The contents of original memory segment 120 must be configured by the original process for subsequent use by the current process after compaction, which requires compaction to generate additional data structures within original memory segment 120. For example, compaction is not the only time that pointers need adjustment. The current process that consumes the delivered data will also adjust the pointers after transfer of the compacted data.

The current process that receives the delivered data might be unable to identify the delivered pointers unless the original process provides pointer metadata that includes an inventory of the pointers. Pointer metadata may be arranged into groups. Grouping of pointer metadata corresponds to categories of target objects of the pointers. One category of target objects includes global or systemic objects that every process of a given high level language may have. Since every process has the same global objects, there is no need to copy global objects into original memory segment 120 for transfer.

Another category of target objects includes singletons that should be copied into original memory segment 120 just in case the current process that receives the delivered data does not already have those singletons. Yet another category of target objects are ordinary objects that can and should be freely copied and delivered from the original process to the current process. Each of these categories of target objects may have its own group of pointer metadata. Pointer metadata and other structural overhead are explained later in the discussion of FIGS. 3 and 4.

2.3 Attachment Overview

The purpose of compaction is to produce a data snapshot that can be consumed by another process or saved for later. Attachment involves preparing, for consumption, the delivered data by the current process that receives the delivered data.

The current process begins attachment by loading the delivered data into current address space 130. Loading may be accomplished in a variety of ways. The original process may have stored the content of original memory segment 120 into a file, in which case loading entails the current process transferring the content of the file into current memory segment 140, either by streaming or file mapping. The original process may instead have allocated original memory segment 120 as shared memory, in which case loading entails the current process mapping the shared memory to current memory segment 140. Indeed, shared memory may be a preferred implementation due to its minimal memory footprint and extremely low latency that, relative to alternative implementations, is nearly instantaneous.

Another alternative is for the original process to stream the data through an inter-process pipe and for the current process to receive the data into current memory segment 140. An embodiment may use any other way that transfers the content of original memory segment 120 into current memory segment 140.

2.4 Graph Relocation

Regardless of how the data is loaded, current memory segment 140 is internally arranged as shown in FIG. 1. Current memory segment 140 has directed object graph 150. Directed object graph 150 includes representative objects 153-155 that are representative of all of the many delivered objects. Representative objects 153-155 are vertices of directed object graph 150. Objects 153-155 are contiguously arranged within current memory segment 140. Pointers 162 between different objects within representative objects 153-155 are the edges of directed object graph 150. Directed object graph 150 does not include pointer metadata and other structural overhead, such as base pointer 144, although these were delivered with directed object graph 150 and also reside in current memory segment 140. Directed object graph 150 is a directed cyclic graph that need not be a connected graph.

After loading the content of original memory segment 120 into current memory segment 140, the current process continues attachment by adjusting directed object graph 150 to accomplish relocation of directed object graph 150. Included among representative objects 153-155 are source objects 160 and target objects 156. Each of source objects 160 may have one or more object pointers 162. Each of target objects 156 may be referenced by one or more object pointers 162 of one or more source objects 160.

Each of object pointers 162 records a memory address 164 that may be the address of one of target objects 156. To reduce the size of pointers 162 and because a memory offset may have a smaller representation than an address has, memory address 164 may instead be an offset relative to a known address.

Some of memory addresses 164 may be an address of an object that existed in original address space 110 but was not copied during compaction and so does not reside in current address space 130. Thus, not all of object pointers 152 reference a target object that is among target objects 156. Such pointers are dangling pointers, explained later herein.

2.5 Pointer Adjustment

The current process adjusts directed object graph 150 by using pointer metadata to adjust all of memory addresses 164 of object pointers 162. The current process iterates through the pointer metadata to discover all of object pointers 162. The current process iterates through object pointers 162. For each of object pointers 162, the current process inspects the one of target objects 156 that is referenced by the pointer.

For example among target objects 156, a particular target may be particular object 152. The current process determines whether different memory segment 170, in current address space 130, already has equivalent object 172 that is equivalent to particular object 152. Object equivalence occurs when two objects have the same type or class, the same fields, and the same field values. With object equivalence, the two objects are substitutes for each other and differ only by which memory address each resides at.

If equivalent object 172 exists for a given particular object 152, then the current process replaces the value of memory address 164 with the address of equivalent object 172. As such, equivalent object 172 replaces particular object 152 as the target referenced by object pointer 162.

If equivalent object 172 does not exist for the given particular object 152, then target object 156 remains the target referenced by object pointer 162. However, the value of memory address 164 is initially invalid because memory address 164 is relative to original address space 110 but needs to be relative to current address space 130. The current process achieves validity of memory address 164 by making an arithmetic adjustment to the value of memory address 164. The current process uses base pointer 144 to adjust memory address 164 as follows.

Each of memory segments 120 and 140 may begin at an arbitrary virtual address. Current memory segment 140 begins at current base address 142. Original memory segment 120 also begins at some base address, which is recorded within base pointer 144 as original base address 146. Original base address 146 was recorded by the original process during compaction. The current process calculates an arithmetic difference of current base address 142 minus original base address 146. This arithmetic difference is an offset that the current process arithmetically adds to memory address 164 as an adjustment. That restores the validity of object pointer 162 and reconnects it with one of target objects 156, which is particular object 152.

As such, the current process either arithmetically adjusts memory address 164 or reassigns it to the address of equivalent object 152, depending on whether equivalent object 152 exists. The current process repeats this operation for each object pointer 162 in directed object graph 150, as inventoried in the pointer metadata.

3.0 Example Attachment Method

Figure 2:
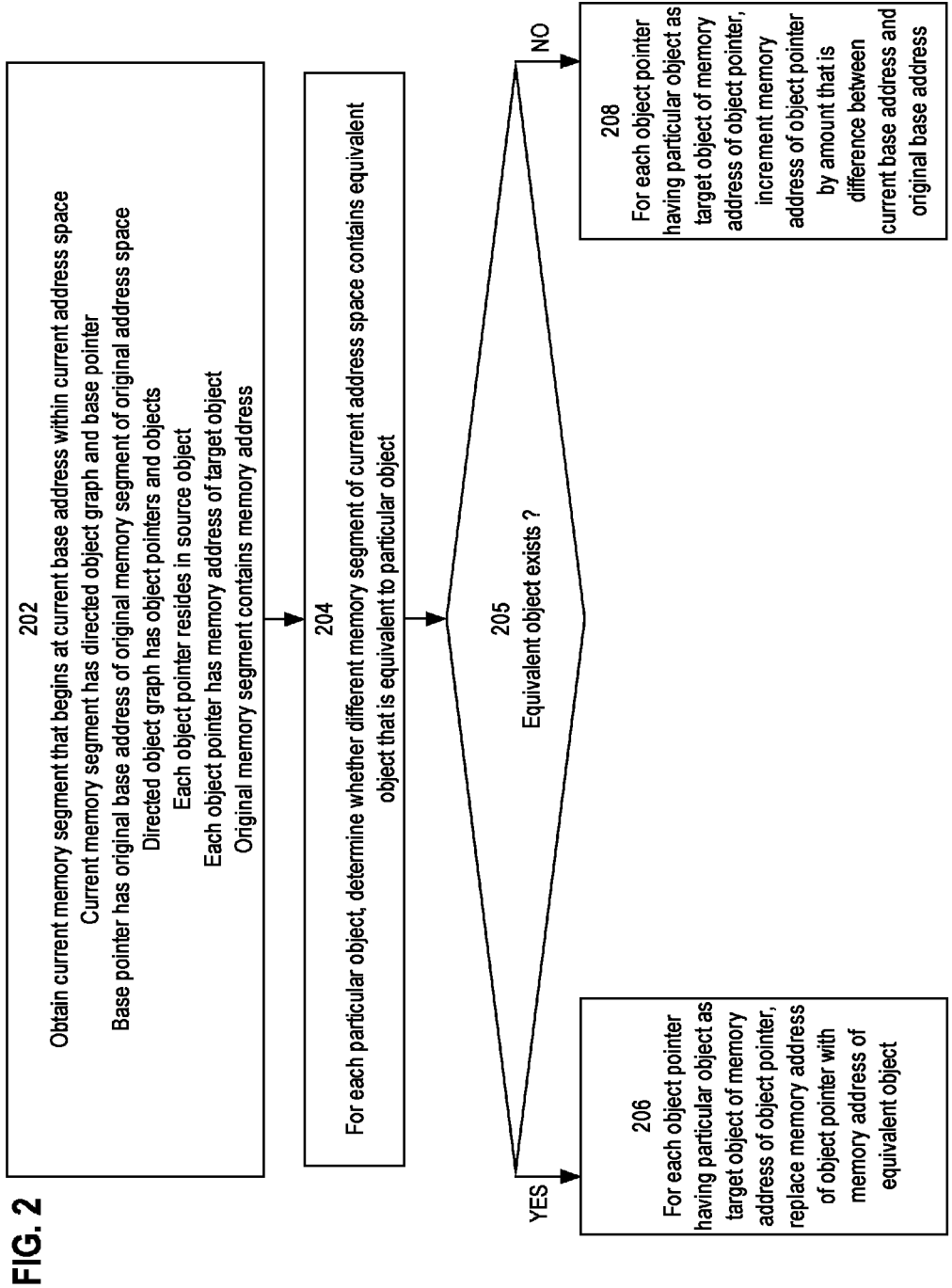
FIG. 2 illustrates an example process for sharing data structures between processes according to an embodiment.

FIG. 2 illustrates an example attachment method that relocates a newly attached object graph according to an embodiment. For explanatory purposes, this method may be discussed with reference to FIG. 1.

In step 202 the current memory segment is obtained, including a directed object graph. For example, the current process loads current memory segment 140 either from a file, from an inter-process pipe, or by mapping to shared memory. Current memory segment 140 has directed object graph 150. Directed object graph 150 has object pointers 162 and objects 153-155. Each of object pointers 162 resides in one of source objects 160 and has a memory address 164, which is the address of one of target objects 156. Each memory address 164 initially refers to an address within original address space 110 because pointer adjustment has not yet occurred.

In step 204 for the target object of each object pointer a different memory segment of the current address space is searched for an object that is equivalent to the target object. For example among target objects 156, a particular target may be particular object 152. The current process determines whether different memory segment 170 already has equivalent object 172 that is equivalent to particular object 152. Object equivalence occurs when two objects have the same type or class, the same fields, and the same field values. In step 205 the current process decides whether an equivalent object was found.

In step 206 an equivalent object was found, and pointers are adjusted to reference the equivalent object. For example, the current process replaces the value of memory address 164 with the address of equivalent object 172. As such, equivalent object 172 replaces particular object 152 as the target referenced by object pointer 162. The current process does this for each of object pointers 162 that reference particular object 152. This is one way of restoring the validity of object pointer 162 during attachment.

In step 208 an equivalent object was not found, and pointers are arithmetically adjusted. This is the other way of restoring the validity of object pointer 162 during attachment. The current process calculates an arithmetic difference of current base address 142 minus original base address 146. This arithmetic difference is an offset that the current process arithmetically adds to memory address 164 as an adjustment. The reconnects object pointer 162 with particular object 152.

4.0 Pointer Arithmetic with Offset from Base Address

Figure 3:
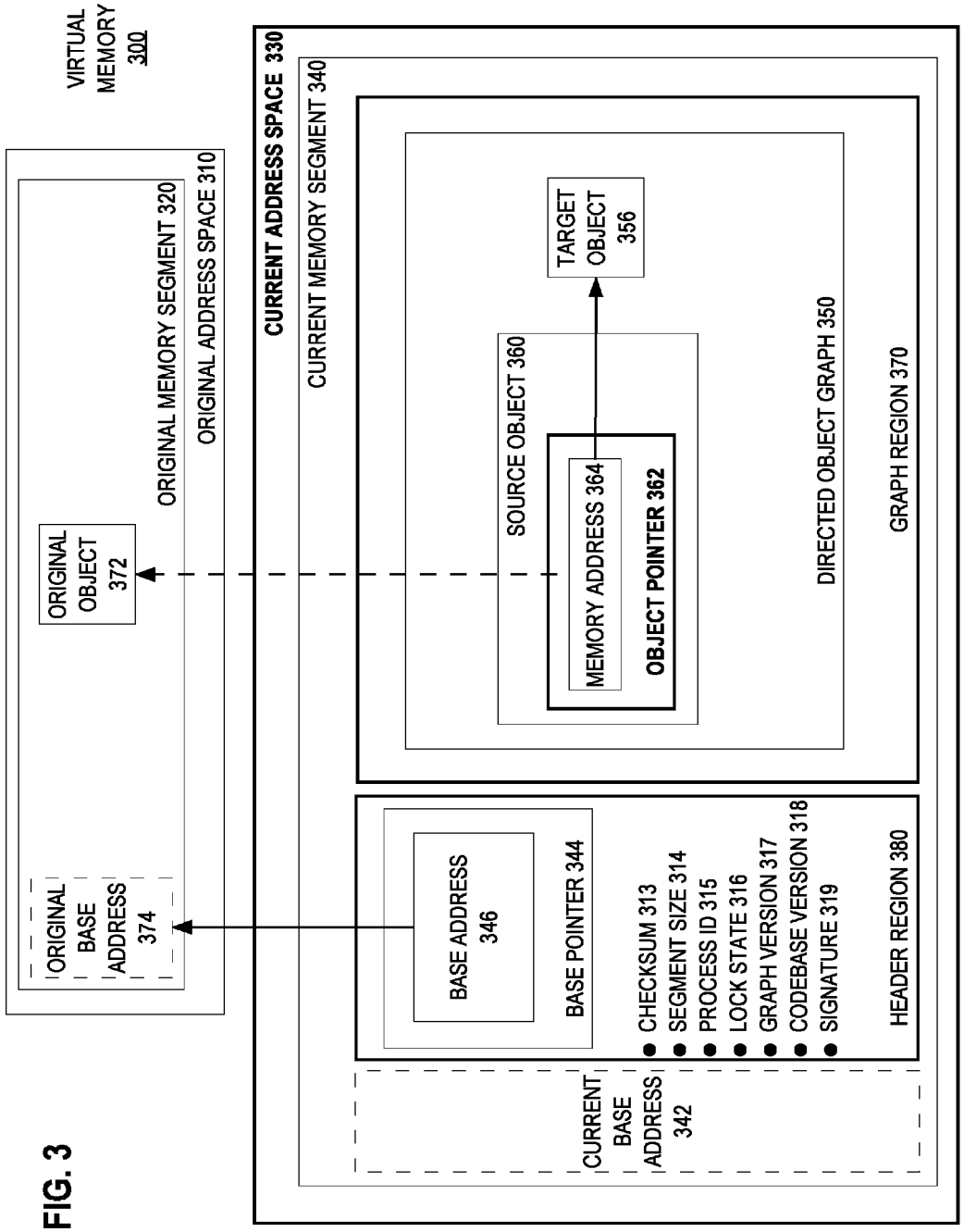
FIG. 3 is a logical block diagram illustrating an example virtual memory in which certain techniques described herein may be implemented, according to various embodiments.

FIG. 3 illustrates a block diagram of example virtual memory 300 for performing pointer math upon, in which techniques described herein may be practiced. Virtual memory 300 may be an implementation of virtual memory 100, although virtual memory 100 may have other implementations. Virtual memory 300 includes current address space 330 and original address space 310. Each of address space 310 and 330 may be an implementation of respective address spaces 110 and 130, although address space 110 and 130 may have other implementations. Original address space 310 has original memory segment 320, which may be an implementation of original memory segment 120.

Current address space 330 may be an implementation of current address space 130, although current address space 130 may have other implementations. Current address space 330 includes current memory segment 340. Current memory segment 340 may be an implementation of current memory segment 140, although current memory segment 140 may have other implementations.

Current memory segment 340 has graph region 370, which has a range of contiguous virtual addresses. Graph region 370 has directed object graph 350. Directed object graph 350 may be an implementation of directed object graph 150, although directed object graph 150 may have other implementations. Directed object graph 350 has source object 360 that is representative of many source objects in directed object graph 350.

Source object 360 has object pointer 362 that records memory address 364. Initially during attachment, memory address 364 records the address of original object 372 that resides in original address space 310. A copy of original object 372 was delivered to the current process as target object 356 in directed object graph 350. However, the value of memory address 364 is initially invalid because memory address 364 is relative to original address space 310 but needs to be relative to current address space 330.

Each of memory segments 320 and 340 may begin at an arbitrary virtual address. Current memory segment 340 begins at current base address 342. Original memory segment 320 begins at original base address 374. Current memory segment 340 has header region 380 that begins at current base address 342. Graph region 370 begins at an address that is a fixed offset from current base address 342 and perhaps immediately after header region 380.

Header region 380 has base pointer 344 that includes base address 346, whose value initially is original base address 374. The current process calculates an arithmetic difference of current base address 342 minus original base address 374. This arithmetic difference is an offset that the current process arithmetically adds to the value of memory address 364 as an adjustment. That adjustment restores the validity of object pointer 362 and connects it with target object 356. The current process repeats this operation for each object pointer, such as object pointer 362, in directed object graph 350, as inventoried in the pointer metadata.

As shown, memory address 364 has two arrows emerging from it. The dashed arrow pointing from memory address 364 to original object 372 represents a stale pointer that is no longer valid during attachment because it points into original address space 310. The solid arrow pointing from memory address 364 to target object 356 represents a valid pointer that has been arithmetically adjusted to point into current address space 330.

5.0 Header Region

Header region 380 has fixed size, with a fixed amount of virtual addresses. Metadata stored in header region 380 is of a fixed amount and has a fixed size. Various metadata may be stored in header region 380, depending on the implementation. Metadata within header region 380 may include any of checksum 313, segment size 314, process identifier 315, lock state 316, graph version 317, codebase version 318, and signature 319. Segment size 314 may indicate a size, such as an amount of bytes or addresses, of current memory segment 340. Header region 380 enables the current process to validate the integrity of current memory segment 340 and verify that the contents of current memory segment 340 are compatible with currently available scripts and middleware.

Checksum 313 or signature 319 may be a hash code, extensible markup language (XML) signature or other digital signature, or other value derived from the contents of current memory segment 340. A digital signature helps defends against a man in the middle attack. A digital signature does this by enabling detection of spoofing the identity of the original process and by enabling detection of tampering the integrity of the region contents. At the beginning of attachment and before pointer adjustment, checksum 313 or signature 319 may be used to validate current memory segment 340. After pointer adjustment, checksum 313 or signature 319 may be recalculated.

Process identifier 315 may be an operating system identifier of the original process. After attachment, process identifier 315 may be reassigned with the value of the identifier of the current process. Lock state 316 may be operated as a semaphore to ensure thread safety during attachment, when both the original process and the current process may contend for access of current memory segment 340, assuming that current memory segment 340 is shared between processes. Graph version 317 may indicate which revision of directed object graph 350 is current, assuming that directed object graph 350 is mutable and perhaps evolving. Codebase version 318 may indicate which build of an application or middleware was used to produce directed object graph 350, such as a build of a virtual machine, a bytecode interpreter, a cluster platform, or application logic.

6.0 External and Internal Relocation Regions

Figure 4:
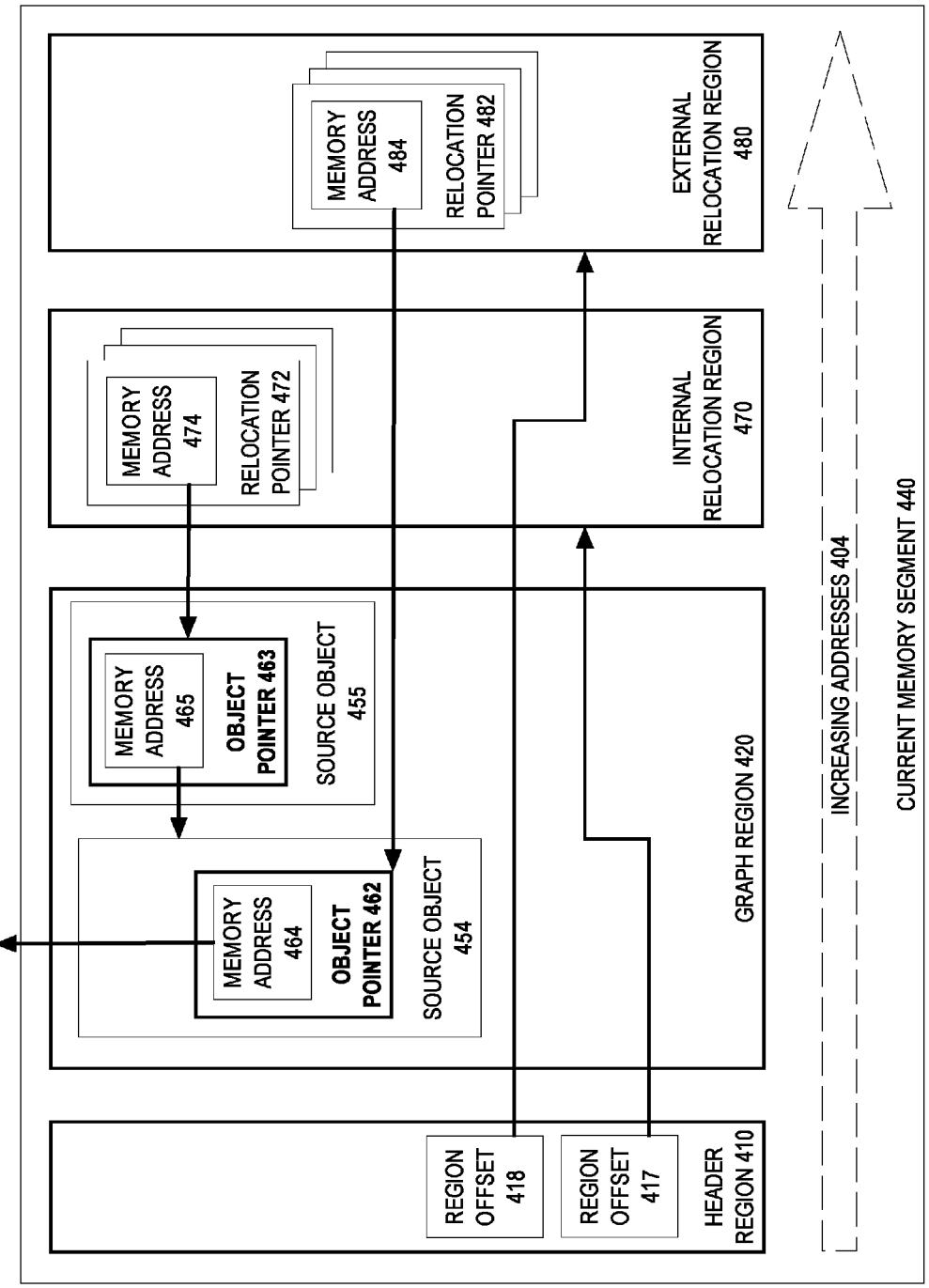
FIG. 4 is a logical block diagram illustrating an example address space in which certain techniques described herein may be implemented, according to various embodiments.

FIG. 4 illustrates a block diagram of example current address space 430 for inventorying pointers, in which techniques described herein may be practiced. Current address space 430 may be an implementation of current address space 130. Current address space 430 includes target object 402 and current memory segment 440. Current memory segment 440 may be an implementation of current memory segment 140. Current memory segment 440 has a range of contiguous virtual addresses. These addresses are arranged from left to right by increasing address, shown as increasing addresses 404. Arranged within current memory segment 440 by increasing address are header region 410, graph region 420, and relocation regions 470 and 480.

Graph region 420 is sized to contain a graph of transferable objects. Some of the transferable objects have object pointers, such as source objects 454-455. The object pointers of FIG. 4 are shown as they would be after attachment, such that all pointers have already been adjusted to restore validity. A particular pointer may reference an object within graph region 420 or an object that is outside of graph region 420. In either case, the particular pointer references an object that resides in current address space 430. In this example, object pointer 463 references source object 454, which is within graph region 420. Object pointer 462 references target object 402, which is outside of graph region 420.

Object pointers 454-455 are shown as recording valid memory addresses 464-465, as when attachment and pointer adjustment have finished. However, during attachment memory addresses 464-465 might not yet be valid because they reference an original address space.

Relocation regions 470 and 480 inventory the object pointers of graph region 420. Relocation regions 470 and 480 are shown as residing to the right of graph region 420 because relocation regions 470 and 480 reside at a higher address than does graph region 420. The current process may find relocation regions 470 and 480 by respectively dereferencing region offsets 417-418 as an offset from a current base address at which current memory segment 440 begins.

During attachment the current process uses relocation regions 470 and 480 to select pointers during pointer adjustment. Some pointers, such as object pointer 463, reference objects, such as source object 454, which reside in graph region 420. Such pointers are entirely internal to graph region 420. These pointers are inventoried in internal relocation region 470, which the current process may find by dereferencing region offset 417.

Within internal relocation region 470 are relocation pointers 472, each of which has memory address 474 that references an object pointer within graph region 420. During attachment the current process may iterate over relocation pointers 472 to identify object pointers in graph region 420 that need arithmetic adjustment. Arithmetic adjustment of pointers may occur as described for FIG. 3, by adding an offset to the address recorded in each pointer.

7.0 Objects not in Graph

Other pointers, such as object pointer 462, refer to objects, such as target object 402, which reside outside of current memory segment 440, elsewhere in current address space 430. These pointers are inventoried in external relocation region 470, which the current process may find by dereferencing region offset 418.

Within external relocation region 480 are relocation pointers 482, each of which has memory address 484 that references an object pointer within graph region 420. During attachment the current process may iterate over relocation pointers 472 to identify object pointers in graph region 420 that need other adjustment. The current process may adjust a pointer by setting the address value of the pointer to refer to a target object, such as target object 402, which resides outside of current memory segment 440 but in current address space 430. Target object 402 may be a singleton, a predefined object, a constant, a literal, or a replica of a transferable object.

7.1 Global Objects

Figure 5:
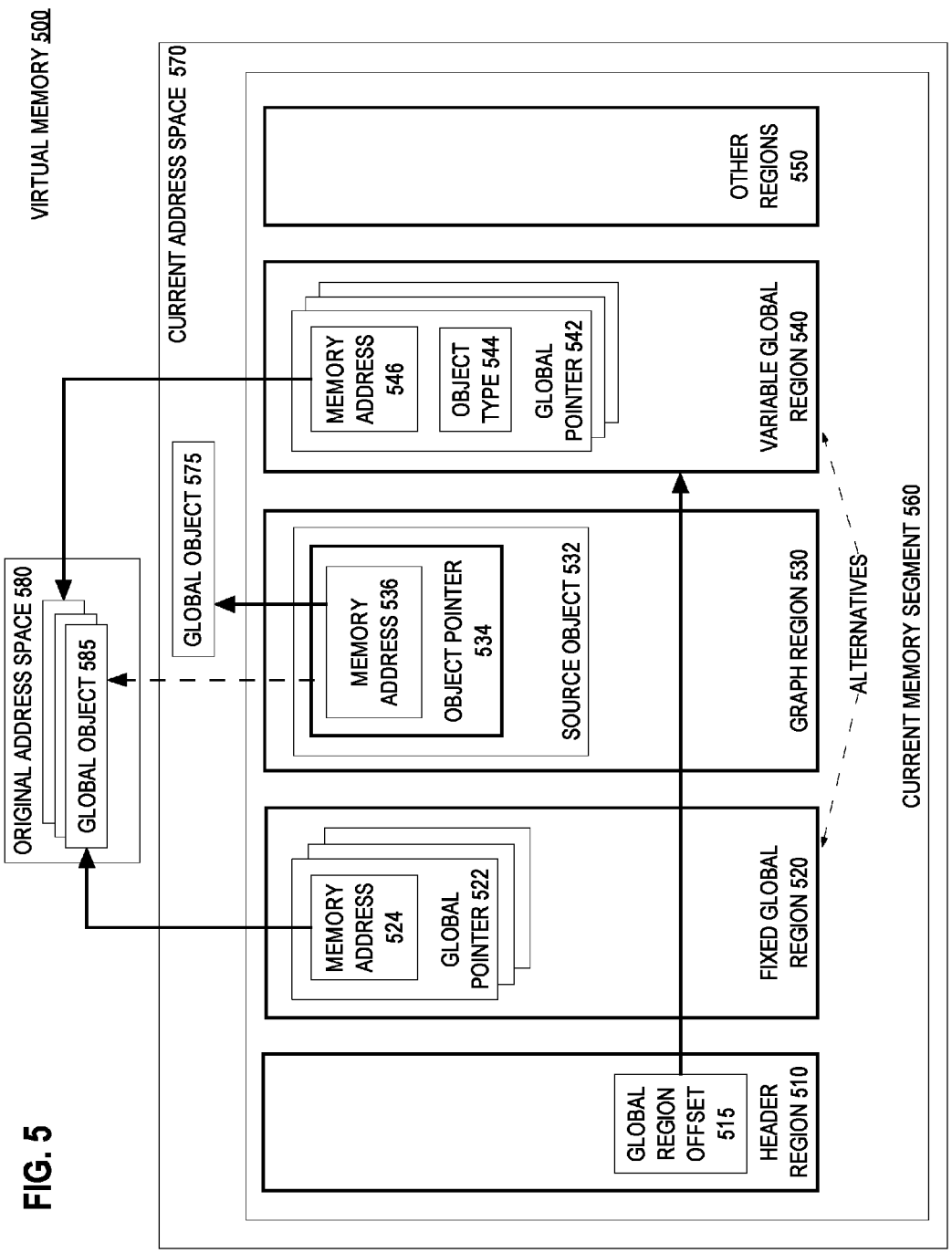
FIG. 5 is a logical block diagram illustrating an example virtual memory in which certain techniques described herein may be implemented, according to various embodiments.

FIG. 5 illustrates a block diagram of example virtual memory 500 for inventorying pointers from within the graph to global objects outside of the graph, in which techniques described herein may be practiced. Virtual memory 500 may be an implementation of virtual memory 100. Virtual memory 500 has address spaces 570 and 580. Current address space 570 has current memory segment 560. Current memory segment 560 has global object 575 and memory regions 510, 520, 530, 540, and 550, arranged contiguously.

Global object 575 is representative of target objects that are predefined by convention and are presumed to always be present in both current address space 570 and original address space 580. Metadata that inventories pointers to global objects may be stored in memory according to either of two non-limiting design alternatives shown in FIG. 5 as global regions 520 and 540.

An implementation may have fixed global region 520. Fixed global region 520 is of fixed size and has a complete inventory of pointers to all global objects that are predefined in both address spaces 570 and 580. The types of the target global objects of the pointers are implied according to pointer ordering within fixed global region 520.

Alternatively, an implementation may have variable global region 540, which inventories only pointers to those global objects actually referenced from within the transferable object graph. Metadata regarding a type of target global object referenced by a pointer is explicitly recorded in variable global region 540. Variable global region 540 is of variable size. The current process may find variable global region 540 by dereferencing global region offset 515.

Within graph region 530 is a graph of objects, including source objects such as source object 532. Source object 532 has object pointer 534 that records memory address 536, which is the address of a global object. Before attachment and shown with a dashed line, memory address 536 records the address of global object 585 in original address space 580. During attachment, the current process sets the value of memory address 536 to the address of global object 575 in current address space 570. Global objects 575 and 585 are identical, but reside in separate address spaces. Address lookup of global objects of current address space 570, such as global object 575, may be delegated to a low level library by the current process.

If fixed global region 520 is present, then the address of each global object is recorded as the value of memory address 524 in global pointer 522. There are as many global pointers 522 as there are global objects 585 or 575. Because fixed global region 520 and header region 510 are of fixed size, an offset from the base address of current memory segment 560 to the start of graph region 560 is implied.

If variable global region 540 is present, then the types of global objects are not implied. Each global pointer 542 has object type 544 that documents what is the type of the target global object. Regardless of whether global region 520 or 540 is present, pointers that reference global objects, such as object pointer 534, are also inventoried in a relocation region, such as external relocation region 480 of FIG. 4. An external relocation region may be part of other regions 550.

7.2 Singleton Objects

Figure 6:
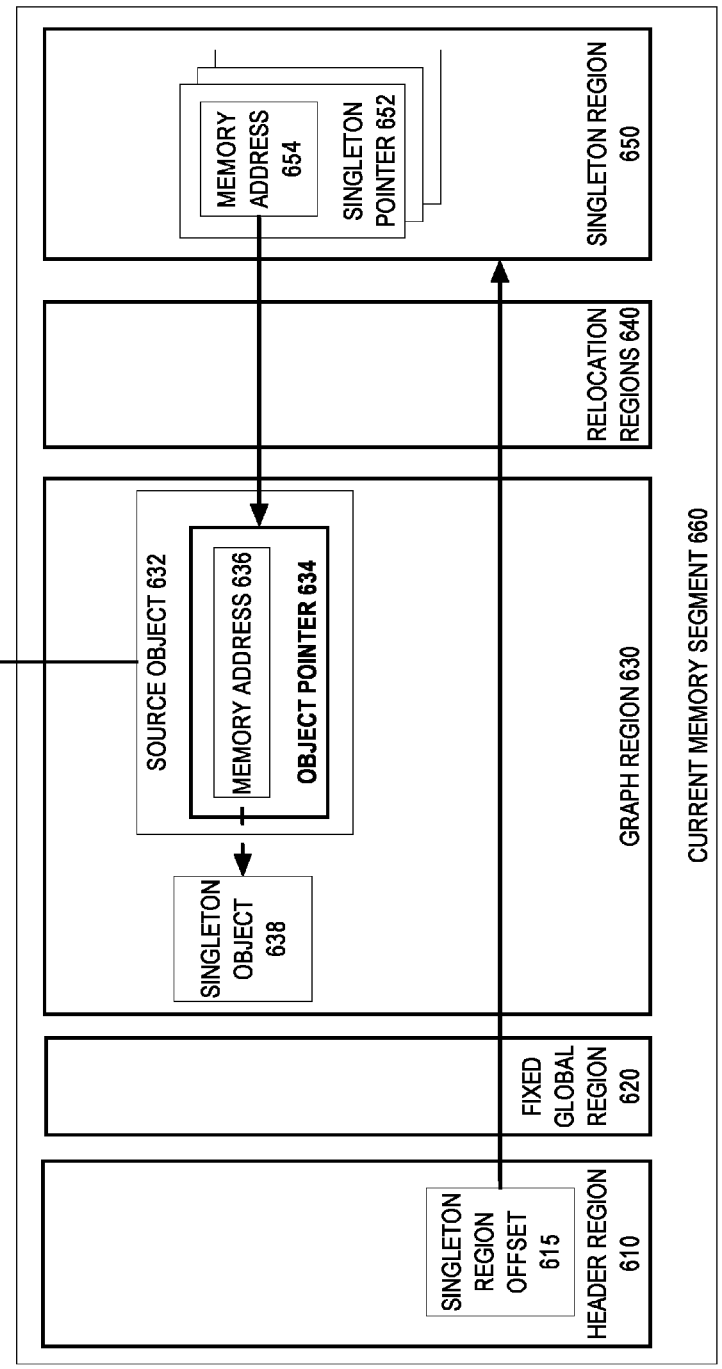
FIG. 6 is a logical block diagram illustrating an example address space in which certain techniques described herein may be implemented, according to various embodiments.

FIG. 6 illustrates a block diagram of example current address space 600 for inventorying pointers that target singleton objects, in which techniques described herein may be practiced. Current address space 600 may be an implementation of current address space 130. Current address space 600 has current memory segment 660 and singleton object 605. Singleton object 605 may be a singleton, a constant, a literal, or a replica of a transferable object.

The current process may have its own objects, such as singleton object 605, in current address space 600 before current memory segment 660 is attached or even exists. Singleton object 605 may be amenable to special treatment, such as comparison by object identity as a performance improvement over comparison by equivalence. However singleton object 605 can be specially treated only if current address space 600 is guaranteed to have only one instance of singleton object 605.

Some transferable objects may possibly be repeated in the original address space and current address space 600, such as singleton object 605. For example, singleton object 605 may be a unique string literal that occurs in both address spaces. If that unique string literal occurs in the transferred object graph, then during attachment of current memory segment 660, current address space 600 may receive a second instance of that string literal.

For example, that string literal may occur both as singleton object 605 and singleton object 638 that is transferred with current memory segment 660. With two instances of the same string literal present in current address space 600, uniqueness is lost, and special treatment as a singleton might not work. However uniqueness can be restored by using singleton region 650.

Current memory segment 660 has header region 610, fixed global region 620, graph region 630, relocation regions 640, and singleton region 650. Header region 610 has singleton region offset 615. The current process may find singleton region 650 by dereferencing singleton region offset 615.

Singleton objects 605 and 638 are duplicates. When attachment begins, object pointer 634 would reference singleton object 638 if memory address 636 were arithmetically adjusted during attachment. Indeed, arithmetic adjustment of memory address 636 would restore the validity of object pointer 634, but mere validity is insufficient when singleton uniqueness is expected. For restoration of uniqueness, singleton region 650 is needed.

Uniqueness is restored by discarding singleton object 638 and retargeting object pointer 634 to instead refer to singleton object 605. Graph region 630 may have pointers, such as object pointer 634, which refer to singleton objects that are also in graph region 630, such as singleton object 638. These pointers to singletons are inventoried in singleton region 650 as singleton pointers, such as singleton pointer 652.

Each singleton pointer 652 has memory address 654 that records the address of an object pointer within graph region 630, such as object pointer 634. During attachment, the current process may iterate through singleton pointers 652 to identify object pointers 634 and set the value of memory address 636 to the address of singleton object 605.

Address lookup of singleton objects of current address space 600 that are not in current memory segment 660, such as singleton object 605, may be delegated to a low level library by the current process. If address lookup fails to find such a singleton object, then the singleton object in graph region 630 is already unique, such as singleton object 638. If singleton object 638 is unique, then an implementation may adjust object pointer 634 to refer to singleton object 638.

Alternatively, an implementation may clone singleton object 638 in current address space 600 outside of current memory segment 660. For example a heap, data frame, or other memory framework of the current process may have structural constraints that require singleton object 638 to be copied into a particular memory location. As such, if singleton object 638 exists, but singleton object 605 does not exist, then the current process may create singleton object 605 as a clone of singleton object 638, discard singleton object 638, and then retarget object pointer 634 to refer to singleton object 605. The current process may delegate object cloning to a low level library.

8.0 Shared Memory

Figure 7:
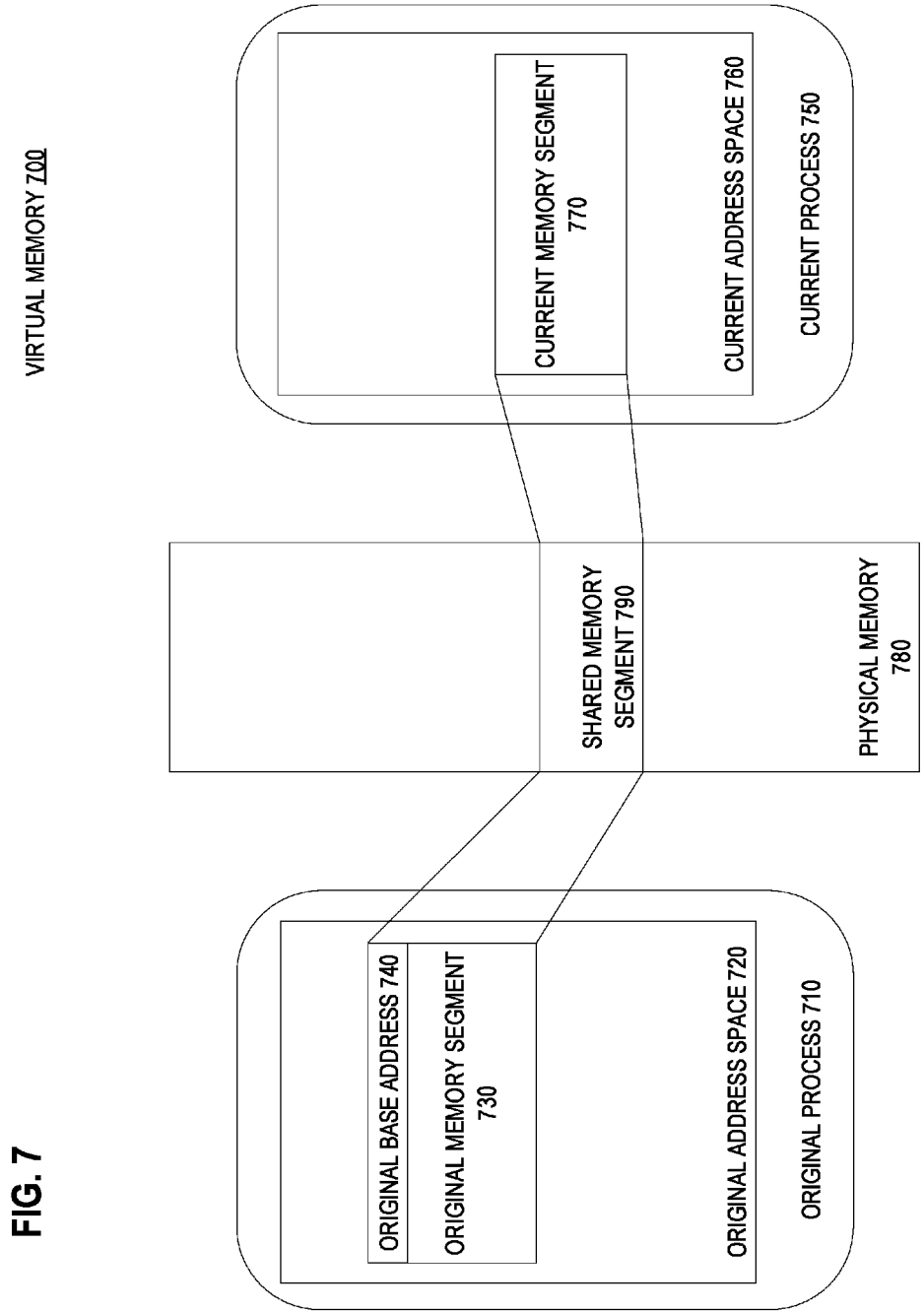
FIG. 7 is a logical block diagram illustrating an example virtual memory in which certain techniques described herein may be implemented, according to various embodiments.

FIG. 7 illustrates a block diagram of example virtual memory 700 that enables a virtual memory segment to be shared between processes, in which techniques described herein may be practiced. Virtual memory 700 may be an implementation of virtual memory 100. Virtual memory 700 has original process 710, current process 750, and physical memory 780. Physical memory 780 may be any aggregation of addressable memory modules, such as dynamic random access memory (RAM), static RAM, or nonvolatile RAM.

Physical memory 780 is managed by an operating system as a cache of portions of a larger virtual memory. A given portion of the virtual memory may be moved between physical memory 780 and a swap file in durable storage, such as a magnetic disk. Physical memory 780 has shared memory segment 790, which may be any portion of any size of virtual memory 700 and has a range of contiguous addresses. As shown in FIG. 7, shared memory segment 790 fits within physical memory 780, although shared memory segment 790 might be too big to fit entirely within physical memory 780.

In preparation for building and transferring an object graph, original process 710 allocates shared memory segment 790 as a portion of virtual memory 780. In a Unix operating system, original process 710 may invoke a portable operating system interface (POSIX) shared memory application program interface (API) function, such as shm_open, to allocate shared memory segment 790 as shareable. In an MS-Windows operating system, original process 710 may instead invoke the CreateSharedMemory function.

A result of allocating shared memory segment 790 by original process 710 is that shared memory segment 790 is memory mapped into original address space 720 as original memory segment 730, which may be an implementation of original memory segment 120. Original process 710 may populate original memory segment 730 with a transferable object graph.

Other processes may memory map shared memory segment 790 into their address spaces. For example, current process 750 may invoke shm_open to memory map shared memory segment 790 into current address space 760 as current memory segment 770. This begins the steps for object graph attachment.

Although memory segments 730 and 770 both map to shared memory segment 790, usually memory segments 730 and 770 will be mapped at different virtual addresses. For example, original base address 740 is usually different from the base address where current memory segment 770 begins. It is for that reason that pointers need arithmetic adjustment during attachment. However, it is possible for memory segments 730 and 770 to be accidentally or programmatically mapped to the same virtual address, in which case arithmetic adjustment of pointers during attachment is unnecessary.

8.1 Copy-on-Write

Pointer adjustment transforms pointers that are valid for original address space 720 into pointers that are valid for current address space 760. Before pointer adjustment, only original process 710 may use the object graph that resides in shared memory segment 790. After pointer adjustment, only current process 750 may use the object graph, even though the graph still resides in shared memory segment 790. Virtual memory 700 may have a copy-on-write (COW) feature.

With copy-on-write, if either process 710 or 750 alters the contents of shared memory segment 790 during sharing, then the operating system will automatically clone shared memory segment 790 into two memory segments of identical contents. Memory segments 730 and 750 will each be respectively memory mapped to one of the two clone segments, and writing by either process 710 or 750 then occurs to only one of the two clone segments.

Copy-on-write is lazy, such that cloning only occurs if and when a process actually writes to shared memory segment 790 during sharing. For example, when current process 750 begins to adjust pointers during attachment, then cloning of shared memory segment 790 occurs.

8.2 Unmapping

After attachment, current process 750 may take exclusive ownership of shared memory segment 790, and original process 710 may detach shared memory segment 790. Similarly, if original process 710 writes original memory segment 730 to a file, then original process 710 may detach original memory segment 730. Detachment involves original process 710 unmapping the memory segment to be abandoned.

However even after detachment, original process 710 may continue to attempt access of original memory segment 730, perhaps for generic activities such as garbage collection. Attempted access of original memory segment 730 after detachment may cause the operating system to prematurely terminate original process 710. Premature termination may be avoided if original process 710 maps a dummy memory segment at the same original base address 740 that original memory segment 730 was mapped at. The dummy memory segment should not contain object pointers that would need pointer adjustment, and as such, the dummy memory segment may itself be shared by many processes.

9.0 Memory Mapped File

Mapping of virtual memory may be used without sharing memory. For example, original process 710 may instead write the contents of original memory segment 730 to a file on a disk or a storage area network. Current process 750 may later memory map that file into current memory segment 770. Such memory mapping of an intermediate file enables processes 710 and 750 to be decoupled in time and space. For example, the logic of current process 750 may be under development. Edit-debug cycling may involve repeatedly refining the logic of current process 750 and repeatedly performing object graph attachment, including memory mapping the contents of an unchanging data file into current memory segment 770.

Processes 710 and 750 may be hosted on different computers, and a transfer of an intermediate file enables original process 710 to transfer an R data frame as an object graph to current process 750. An intermediate file also helps federate consumers of an object graph. For example, original process 710 may write an object graph to an intermediate file, and then any number of current processes 750 may, perhaps simultaneously, attach to the object graph by memory mapping the file.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
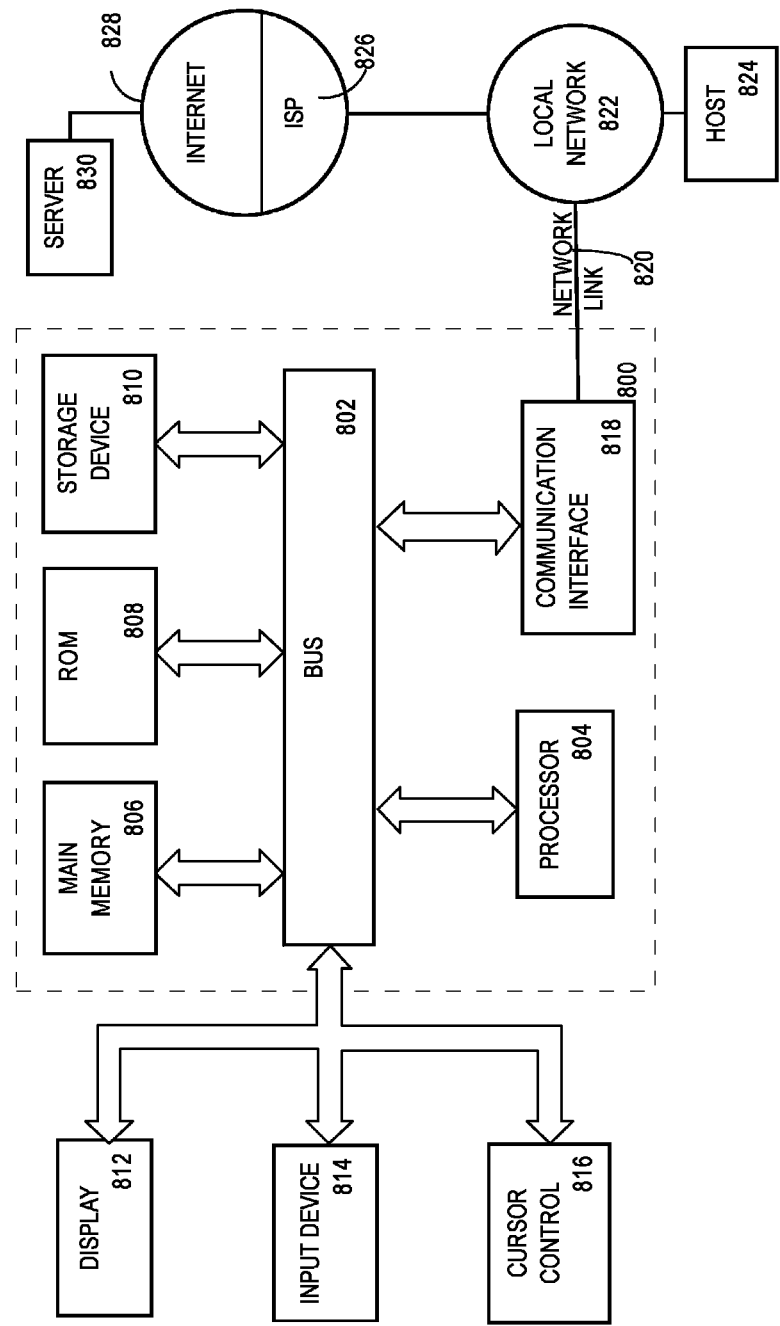
FIG. 8 is a block diagram illustrating one embodiment of a computer system suitable for implementing methods and features described herein.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a light emitting diode (LED) display, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

11.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   obtaining a directed object graph that contains a plurality of object pointers and a plurality of objects, wherein each object pointer of the plurality of object pointers resides in a source object of the plurality of objects, wherein each object pointer of the plurality of object pointers comprises a memory address of a target object, wherein an original address space contains the memory address of the target object, wherein the plurality of objects are not contiguously stored in the original address space, wherein the directed object graph resides in one or more original memory segments of the original address space;
   obtaining an additional memory segment that begins at a base address within the original address space;
   recording the base address within the additional memory segment;
   for each particular object of the plurality of objects:
      copying the particular object into the additional memory segment at a respective address;
      for each object pointer of the plurality of object pointers having the particular object as the target object of the memory address of the object pointer, replacing the memory address of the object pointer with the respective address;
   providing contents of the additional memory segment in a different address space that is not the original address space.

2. The method of claim 1 wherein the plurality of objects is contiguously copied into a memory region of the additional memory segment.

3. The method of claim 2 wherein the memory region begins at a fixed offset from the base address.

4. The method of claim 1 wherein providing the contents of the additional memory segment in a different address space comprises copying the contents of the additional memory segment into the different address space.

5. The method of claim 1 wherein obtaining additional memory segment comprises obtaining a mapped memory segment.

6. The method of claim 5 wherein:
   obtaining a mapped memory segment comprises obtaining a shared memory segment that is shared by an original process and a different process that is not the original process;
   the original process is associated with the original address space;
   the different process is associated with the different address space.

7. The method of claim 6 wherein the shared memory segment is configured as copy-on-write.

8. The method of claim 5 wherein the mapped memory segment comprises a memory mapped file.

9. The method of claim 1 wherein:
   the additional memory segment comprises a header region;
   the header region begins at the base address;
   recording the base address within the additional memory segment comprises recording the base address within the header region.

10. The method of claim 9 wherein:
    the additional memory segment comprises a graph region and one or more metadata regions;
    copying the particular object into the additional memory segment comprises copying the particular object into the graph region;
    the method further comprises recording, within the header region, one or more region offsets;
    each region offset of the one or more region offsets comprises an address offset, relative to the base address, of a metadata region of the one or more metadata regions.

11. The method of claim 10 wherein:
    the plurality of object pointers comprises a plurality of global pointers;
    each global pointer of the plurality of global pointers comprises a memory address of a global object, in the original address space, that is referenced by an object that is not in the plurality of objects;
    the one or more metadata regions comprises a global region;
    the method further comprises storing the plurality of global pointers within the global region.

12. The method of claim 9 further comprising storing, within the header region, at least one of: a checksum, a segment size, a process identifier, a lock state, a graph version, a codebase version, and a signature.

13. The method of claim 1 wherein the one or more original memory segments comprises a data frame of R programming language.

14. The method of claim 1 wherein:
    the method further comprises storing, within the additional memory segment, a plurality of relocation pointers;
    each relocation pointer of the plurality of relocation pointers comprises a memory address of an object pointer of the plurality of object pointers.

15. The method of claim 14 wherein storing the plurality of relocation pointers comprises, storing each relocation pointer of the plurality of relocation pointers at a respective address that is higher than a highest memory address of the plurality of objects within the additional memory segment.

16. The method of claim 14 wherein storing the plurality of relocation pointers within the additional memory segment comprises:
    storing, in a particular region, relocation pointers of the plurality of relocation pointers that reference an object pointer that has a target object that is in the plurality of objects;
    storing, in a different region that is not the particular region, relocation pointers of the plurality of relocation pointers that reference an object pointer that has a target object that is not in the plurality of objects.

17. The method of claim 1 wherein:
the plurality of object pointers comprises a plurality of singleton pointers;
each singleton pointer of the plurality of singleton pointers has a target object that is a singleton, a predefined object, a constant, or a literal;
the additional memory segment comprises a singleton region;
the method further comprises storing the plurality of singleton pointers within the singleton region.

18. One or more non-transitory computer readable media comprising instructions that, when executed by one or more processors, cause:
obtaining a directed object graph that contains a plurality of object pointers and a plurality of objects, wherein each object pointer of the plurality of object pointers resides in a source object of the plurality of objects, wherein each object pointer of the plurality of object pointers comprises a memory address of a target object, wherein an original address space contains the memory address of the target object, wherein the plurality of objects are not contiguously stored in the original address space, wherein the directed object graph resides in one or more memory segments of the original address space;
obtaining an additional memory segment that begins at a base address within the original address space;
recording the base address within the additional memory segment;
for each particular object of the plurality of objects:
copying the particular object into the additional memory segment at a respective address;
for each object pointer of the plurality of object pointers having the particular object as the target object of the memory address of the object pointer, replacing the memory address of the object pointer with the respective address;
providing contents of the additional memory segment in a different address space that is not the original address space.

19. The one or more non-transitory computer readable media of claim 18 wherein:
the additional memory segment comprises a header region;
the header region begins at the base address;
recording the base address within the additional memory segment comprises recording the base address within the header region.

20. The one or more non-transitory computer readable media of claim 18 wherein:
the instructions, when executed by the one or more processors, further cause storing, within the additional memory segment, a plurality of relocation pointers, wherein each relocation pointer of the plurality of relocation pointers comprises a memory address of an object pointer of the plurality of object pointers;
storing the plurality of relocation pointers within the additional memory segment comprises:
storing, in a particular region, relocation pointers of the plurality of relocation pointers that reference an object pointer that has a target object that is in the plurality of objects;
storing, in a different region that is not the particular region, relocation pointers of the plurality of relocation pointers that reference an object pointer that has a target object that is not in the plurality of objects.

* * * * *